3,106,022
Patented Oct. 8, 1963

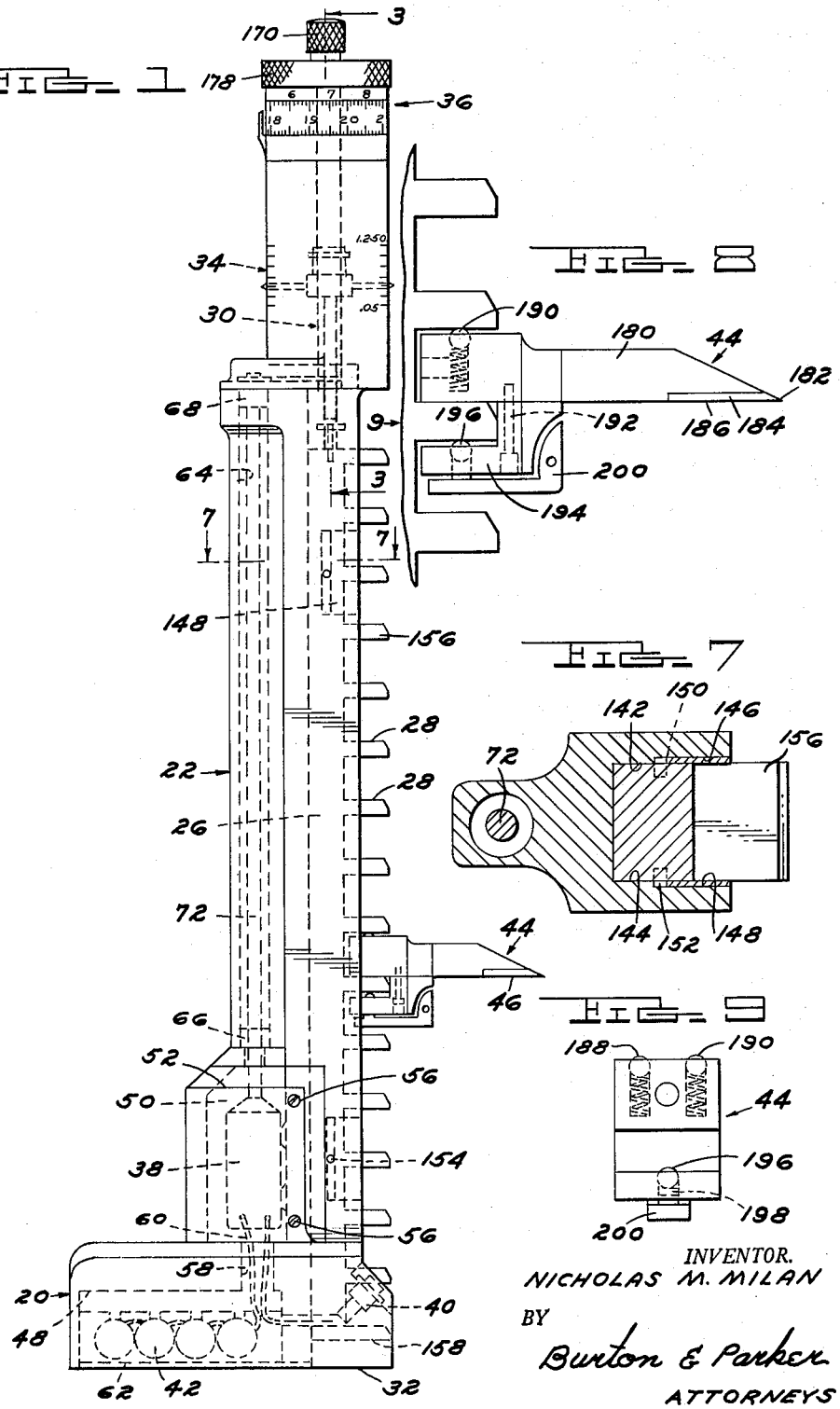

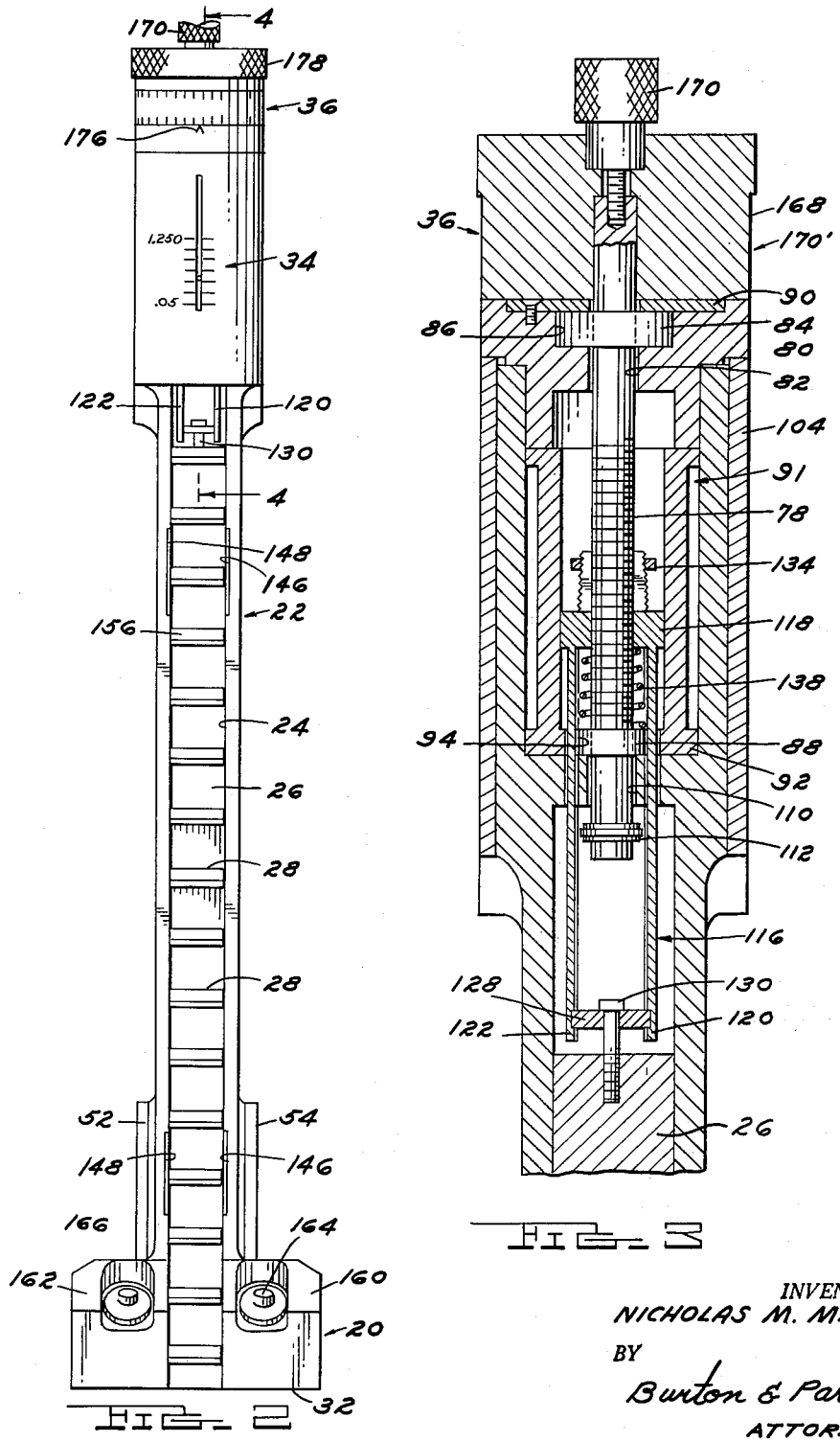

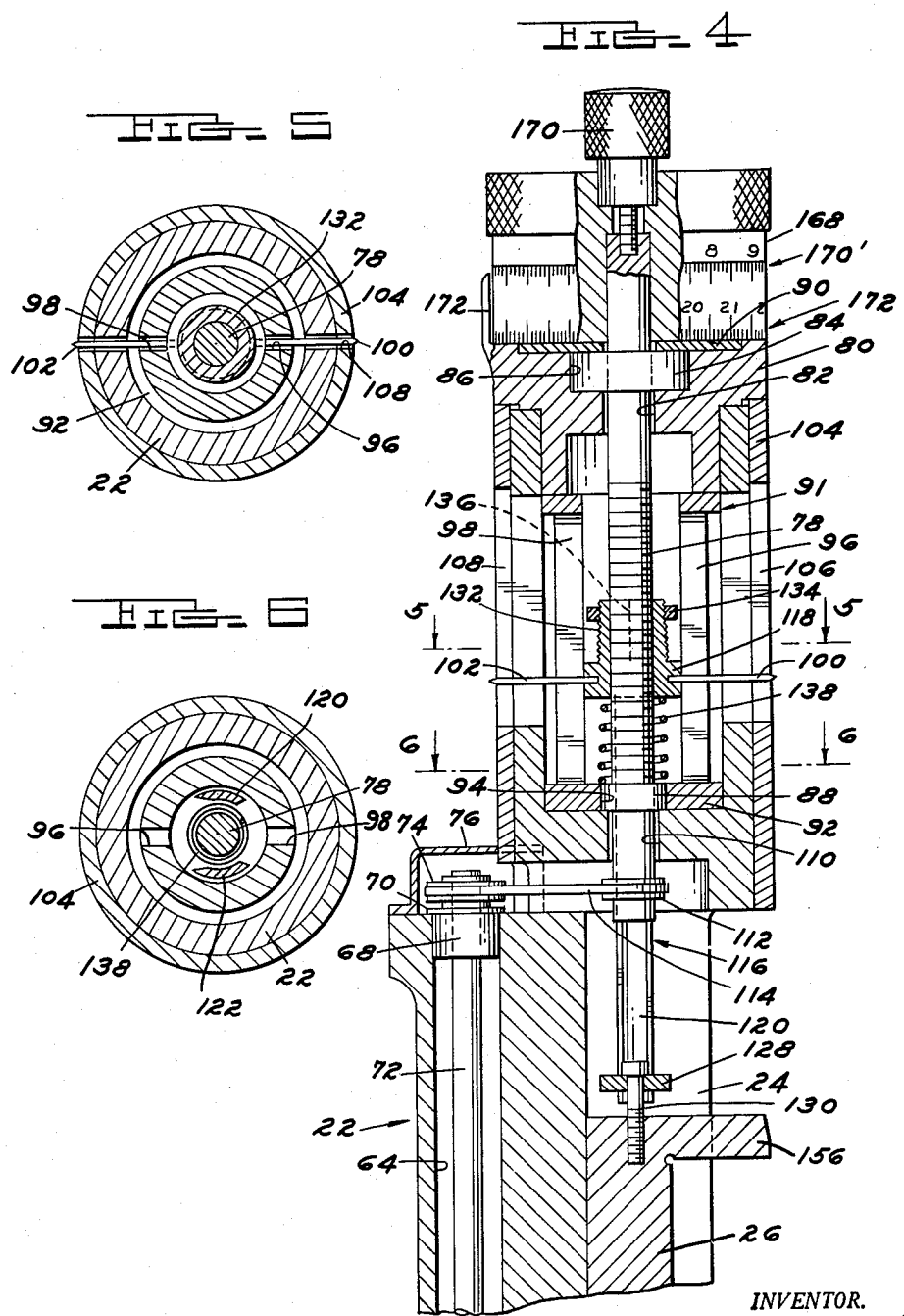

3,106,022
HEIGHT GAUGE
Nicholas M. Milan, Detroit, Mich., assignor to R & M Manufacturing Corporation, Ferndale, Mich., a corporation of Michigan
Filed Apr. 18, 1960, Ser. No. 22,798
1 Claim. (Cl. 33—170)

This invention relates to measuring devices and particularly height gauges. A height gauge is employed to measure vertical dimensions of a work piece, with both the work piece and a height gauge resting on what is termed a surface plate. Height gauges are of generally two types: the direct measuring type in which a movable finger under control of a micrometer screw and whose position may be read with a suitable measuring scale is vertically shifted at the work piece to pick off dimensions of the work piece; or the reference type, which is used in conjunction with a surface gauge. The movable finger of the surface gauge picks off dimensions of the work piece and then the surface gauge is shifted to a position adjacent the height gauge and the position of the movable finger of the surface gauge checked by reference to a vertically movable surface on the height gauge whose vertical position is known.

An object of the present invention is the provision of a height gauge which may be employed as a reference type gauge or a direct reading type gauge. A concomitant object is the provision of a removable finger which may be quickly and easily mounted on the gauge to adapt the gauge for direct measuring or may be removed from the gauge to adapt the gauge for use as a reference type height gauge.

Another object of the invention is the provision of a height gauge having a measuring surface with respect to which measurements are made and whose vertical position is controlled by a micrometer screw mechanism and determined by reference to a scale on the gauge, and in which the vertical movement of the measuring surface is facilitated by an electric motor operatively connected to the micrometer screw mechanism whereby the measuring surface may be quickly and easily shifted without tedious manual turning of the micrometer screw mechanism.

Another object of the invention is the provision of a self-contained electrically powered height gauge in which rough vertical adjustment of a measuring surface is controlled by switch means on the gauge.

Another object of the invention is the provision of a height gauge having a base and an upstanding pillar provided with a vertically extending channel-shaped groove within which is slidably mounted a non-rotatable measuring bar having a plurality of laterally projecting reference planes or surfaces defined by a succession of vertically spaced-apart steps, lugs, or ears integral with the bar, and in which a micrometer screw mechanism at the top of the pillar and connected with the bar serves to vertically shift the bar, with the vertical position of the reference surfaces determined by suitable scale means adjacent the micrometer screw mechanism.

Another object of the invention is the provision of a height gauge having a base and a pillar upstanding from the base with a vertically shiftable measuring bar received in the pillar for vertically guided movement and with a rotatable micrometer screw at the upper end of the pillar provided with a micrometer nut thereupon from which said bar is suspended, and with said nut having means for tightening the same upon the screw to compensate for wear between the nut and screw.

Other objects, advantages, and meritorious features will more fully appear from the specification, claims, and accompanying drawings, wherein:

FIG. 1 is a side elevation of a height gauge embodying our invention;
FIG. 2 is a front elevation of the gauge;
FIG. 3 is a cross-sectional view taken substantially on the line 3—3 of FIG. 1;
FIG. 4 is a view partly in section taken substantially along the line 4—4 in FIG. 2;
FIG. 5 is a cross-sectional view taken on the line 5—5 of FIG. 4;
FIG. 6 is a cross-sectional view taken substantially on the line 6—6 of FIG. 4;
FIG. 7 is a cross-sectional view taken on the line 7—7 of FIG. 1;
FIG. 8 is a side elevation showing in greater detail the mounting of the measuring finger shown in FIG. 1 upon the measuring bar; and
FIG. 9 is an end view of the measuring finger looking in the direction of arrow 9 in FIG. 8.

The general arrangement of the gauge is best shown in FIGS. 1 and 2. The gauge includes a support comprising a hollow base portion 20 upwardly from which extends a pillar 22. Slidably disposed within a vertically extending laterally opening channel 24 in the pillar groove is a measuring bar 26 having a plurality of vertically spaced-apart reference or measuring surfaces, planes, or the like 28. These measuring surfaces are spaced apart equal distances, with such spacing being exactly one inch. The measuring bar is suspended from the upper end of the pillar by micrometer screw mechanism 30 more completely shown in FIGS. 4–6, inclusive. Scale means associated with the micrometer screw mechanism serves to indicate the distance of the reference planes 28 above the bottom surface 32 of the base. Such scale means includes a rough scale 34 and a fine scale 36.

For quickly shifting the reference planes, an electric motor 38 is mounted in the gauge and electrically connected through switch means 40 to the source of electric energy, such as the batteries 42 disposed within the hollow base, with the motor drivingly connected to the micrometer screw mechanism. Upon selective actuation of the switch means 40, the motor is energized to operate in one direction to raise the measuring bar and upon alternative actuation of the switch means is reversely energized to lower the measuring bar.

Removably mounted on the measuring bar is a measuring finger 44 having a measuring or reference surface 46. This measuring finger is received over one of the laterally projecting ears or lugs on the measuring bar and between such lug and the next superjacent lug such that its measuring surface 46 is exactly coplanar with the measuring surface 28 of the lug or ear over which the finger is received. The finger 44 adapts the gauge for direct measurement of a work piece. Without finger 44 the gauge is used as a reference type height gauge in conjunction with a conventional surface gauge (not shown).

It is to be understood that the gauge is adapted to rest upon a surface plate (not shown) with the bottom surface 32 of the base bearing flushly upon the surface plate. The work piece (not shown), with respect to which measurements are to be made, is also rested upon the surface plate. If the gauge is to be used as a reference type height gauge, the finger 44 may be removed from the measuring bar. In such case a surface gauge will be placed on the surface plate. Measurements will be transferred between the reference surfaces 28 and the work piece by use of the adjustable finger of the surface gauge. Where the height gauge is to be used for direct reading, the finger 44 will be mounted on the measuring bar and measurements made directly by moving the height gauge adjacent the work piece such that the surface 46 either abuts or is coplanar with a point on the work piece whose distance above the surface plate is to be determined.

More specifically, the base portion 20 and the pillar are preferably formed of one piece of metal. The base is provided with a hollow interior forming a battery-receiving chamber 48 within which the batteries 42 are disposed. While the motor 38 might in some instances be mounted within the confines of the base, it is shown in this embodiment as disposed within a hollow portion 50 of the pillar 22, and mounted therein in any suitable fashion. Such hollow portion of the pillar may be closed at opposite ends by closure plates 52 and 54 which are secured as by screws 56. The base is provided with a vertical passageway 58 through which the electric leads 60 from the batteries and switch means 40 may extend to the hollow portion 50 of the pillar. The chamber 48, hollow portion 50, and passageway 58 may be considered as providing a hollow enclosure at the lower end of the height gauge within which the battery and motor are disposed. The bottom of the battery chamber may be closed in any suitable fashion as by a plate 62.

Extending vertically upwardly through the pillar above the motor chamber 50 is a motor drive shaft passageway 64. The lower end of such passageway has a reduced diameter portion providing an annular shoulder upon which is seated a drive shaft bearing 66. The bearing 66 may be press fitted within the passage 64. At the upper end of the passageway 64 is a second bearing 68 having an integral shoulder 70 which overlies that portion of the pillar adjacent the passage 64. Bearing 68 may also be press fitted within passageway 64. Connected to the drive shaft of motor 38 and extending upwardly through the passageway 64 and carried by the bearings 66 and 68 is a drive shaft 72 provided with a pulley 74 at the upper end thereof. The pulley is covered by a removable cap or housing plate 76, which is held to the pillar in any suitable fashion.

The micrometer screw mechanism 30 is disposed at the upper end of the pillar and includes a vertically extending micrometer screw 78 disposed in substantial alignment with the laterally opening channel 24 of the pillar 22. The upper end of the pillar which houses the micrometer screw mechanism is of cylindrical shape and is interiorly recessed to receive such mechanism. The open upper end of the recess of the pillar is closed by a plug member 80 having an axial passageway 82 through which the micrometer screw 78 extends. A bearing 84 is press fitted within a counterbore 86 of the plug 80 and supports the upper end of the micrometer screw for rotation. Bearing 84 may be of the anti-friction type and the inner race thereof (not shown) is press fitted about the micrometer screw. Adjacent the lower end of the micrometer screw, another bearing 88, similar to but smaller than bearing 84 is, press fitted upon the screw and bears against the bottom of the hollow interior of the pillar. A plate 90 overlies bearing 84 and may be secured within a recess in the upper end of the pillar in any suitable fashion. The plate 90 prevents upward axial movement of the micrometer screw.

Disposed within the hollow interior of the upper end of the pillar is a hollow cylindrical member 91, closed at the bottom by a wall portion 92, which is axially bored, as at 94, to receive the bearing 88, which may be press fitted therein. The bottom portion 92 of the cylindrical member cooperates with the hollow interior of the upper end of the pillar and with bearing 88 to laterally stabilize the screw. The member 91 is held down against the bottom of the hollow interior of the upper end of the pillar by the plug 80. The plug 80 may be press fitted within the upper end of the pillar. The hollow member 91 is provided with a pair of vertically extending diametrically spaced slots 96 and 98, through which extend pointers 100 and 102. The pillar is correspondingly slotted at diametrical positions to allow the pointers to project through the pillar. Telescoped over the upper end of the pillar is a sleeve 104 and provided at diametrical locations with slots 106 and 108 registering with the slots in the pillar and in the member 91. Adjacent each slot 106 and 108 the sleeve is provided with a vertically extending scale having major graduations spaced apart at intervals of tenths of an inch, and minor graduations spaced apart at intervals of .025". The scale covers a range of 1.200".

At the bottom of the hollow interior of the upper end of the pillar, a passageway 110 allows for projection of the lower end of the screw 78 into the channel 24. A pulley 112 is mounted on such projecting end of the screw and a belt drive or the like 114 connects pulley 112 with pulley 74. It is now apparent that upon energization of electric motor 38 the micrometer screw 78 will be rotated in a direction depending upon the direction of rotation of the motor.

Mounted on the micrometer screw 78 and extending downwardly therefrom and connected to the upper end of the measuring bar to suspend the measuring bar from the micrometer screw and cause vertical shifting of the measuring bar upon rotation of the screw is hanger means 116. Such hanger means comprise a nut portion 118 and a pair of depending arcuate parallel arms 120 and 122. Such arms extend through correspondingly shaped slots 124 and 126 in the bottom wall 92 of the cylindrical member 91 and similar slots in the bottom of the hollow interior of the upper end of the pillar. The lower ends of such arms are transversely slotted to receive a plate 128 through which a screw fastener 130 extends and which is threadedly connected in the upper end of the measuring bar. The screw fastener 130 draws the bar and the arms 120 and 122 securely together. The pulley 112 is disposed between the arms with there being sufficient clearance for operation of the belt drive 114. The slots 124 and 126 in the bottom wall 92 are sized to receive the arms in a slip fit and to prevent any appreciable tendency of the arms to revolve during rotation of the screw. The pointers 100 and 102 are carried by the means 116 and may be press fitted within the nut portion 118 thereof.

Nut portion 118 is provided thereabove with a tapering threaded sleeve 132 upon which is threadedly received a tension nut 134. The sleeve is vertically split as at 136 such that upon tightening of the tension nut 134 downwardly along the sleeve, the sleeve will serve to more tightly grip the screw 78. The interior of the sleeve 132 is threaded as is the interior of the nut proper 118. The tension nut cooperating with the split sleeve serves to allow for take-up resulting from wear between the threads of the micrometer screw and the threads of the nut 118.

Disposed between the nut and the bearing 88 is a combination spring 138 which tends to urge the nut and consequently the measuring bar upwardly and relieves the electric motor 38 of the load it would otherwise be under. In essence, the spring serves to balance, to some extent, the weight of the measuring bar. The spring is designed to have a substantially constant rate over the vertical movement of the bar or specifically throughout a range of substantially 1.200".

The channel 24 prevents rotation of the measuring bar and serves to guide the bar during its vertical movement. Because the bar is substantially enclosed within the channel, it is protected. Only the laterally projecting reference surfaces extend outwardly of the channel. To hold the bar within the channel and to ensure its closely guided movement, Carboloy inserts are provided in the side walls of the channel as shown in FIG. 7. The side walls 142 and 144 of the channel 24 are laterally slotted at positions adjacent the upper and lower ends of the channel and throughout a vertical dimension exceeding the range of measuring movement of the bar as at 146 and 148 in FIG. 7. The slots adjacent the bottom of the channel are similar to those shown in FIG. 7. Within each slot a Carboloy insert is press fitted allowing space for a pin to project between the bottom of the slot and the insert.

The measuring bar is provided with four pins, two of which are shown in FIG. 7 at 150 and 152. The pins prevent lateral outward movement of the bar from the channel 24. One of the pins adjacent the lower end of the bar is indicated at 154 in FIG. 1.

At least the lower surface of the base and the interior of the channel 24 are hardened. The measuring bars at at least those surfaces bearing against the walls of the channel are also hardened. Disposed in vertically spaced-apart relation and projecting laterally from the bar and integral therewith are a plurality of shoulders, lugs, or ears 156 whose upper surfaces provide the planes 28 hereinbefore mentioned.

Each plane 28 is spaced from its adjacent corresponding planes 28 exactly 1" plus or minus .0000125". The measuring bar in its lowermost position is adapted to have the under surface 158 of the lowermost lug 156 bear flushly upon the surface table on which the gauge rests when in use. In this position the upper surface 28 of the same lug is disposed .2" above the surface table and each surface 28 of superjacent lugs is some whole multiple of an inch plus .2". The gauge is adapted to measure vertical dimensions over a range of 1.2" without referring to any more than one of the reference planes 28 and by use of different lugs 156 the total height over which the gauge may be employed will be from a minimum height of .2" to a maximum height of 16.2".

The base portion 20 is provided, as shown in FIGS. 1 and 2, with inclined faces 160 and 162 within which are mounted two push-button type switches 164 and 166, which comprises the switch means 40 heretofore mentioned. Suitable wiring, which will be obvious to those skilled in the art, stems from the batteries 42 to switches 164 and 166, and from thence to the electric motor 38, such that upon depression of one of the switches, the motor will be energized to drive the shaft 72 in one direction, while upon release of such switch, the motor will stop, and depression of the other switch will cause energization of the motor and driving of shaft 72 in the opposite direction.

At the upper end of the micrometer screw mechanism is a fine scale mounted on a circular member 168, which is received over the upper end of the micrometer screw and secured thereagainst by the knurled screw member 170. The scale on member 168 comprises a pair of scales displaced 180 degrees from each other such that vertical positions of the measuring bar can be readily ascertained from readings at either side of the height gauge. The graduations of each of these two scales are in thousandths and ten-thousandths of an inch with the range of the scale covering 1.200".

For the upper scale indicated at 170, a pointer 172 is fixed to the pillar. For the lower scale 174, a reference mark 176 is provided as shown in FIG. 2 on the exterior of the circular surface of the upper end of the pillar immediately below the member 168. Member 168 may be knurled as at 178 to facilitate manual operation of the gauge independently of the motor.

In use of the gauge, the electric motor is operated to raise or lower the surface 28 to positions substantially where measurements are to be made, with final adjustment of the surfaces accomplished by manual operation effected by grasping either the knurled surface 178 or the knurled surface of the screw member 170 and rotating the same. The electric motor will eliminate the tedious turning of the micrometer screw and will speed up the positioning of the surfaces 28, which is of substantial importance in reducing the workman's time.

To adapt the gauge for direct reading, the finger 44 is provided. It includes a channel-shaped opening which is receivable in embracing relationship over any one except the bottom lug 156. The finger comprises a body member 180 having a pointed end 182, which may be used for scribing. Inserted in the member 180 is a hardened insert 184 on which the point 182 is formed. The lower surface 186 of the insert, when the finger is mounted upon one of the lugs, is exactly coplanar with the surface 28 of the lug. A pair of spring-loaded ball members 188 and 190 are received in the finger to bear against the lug superjacent the lug over which the finger is received. These spring-loaded balls serve to prevent the finger from falling off the measuring bar prior to its being locked in place. Fastened to the underside of the finger as by screws, one of which is indicated at 192, is an L-shaped part 194. A ball 196 is disposed in the part 194 to be urged upwardly against the underside of the embraced lug by the threaded portion 198 of the tightening lever 200 integral with the threaded part 198. Upon swinging lever 200 to threaded part 198 upwardly, the ball 196 is urged against the underside of the embraced lug to draw the finger down flush against surface 28 of the lug and lock the finger in place. If desired, the underside of each lug may be provided with a slight depression to receive the ball member 196. Upon swinging the lever 200 in the opposite direction to release ball 196, the finger may be removed from the measuring bar.

What I claim is:

A height gauge comprising, in combination: a support including a base and a pillar upstanding from the base, said pillar provided with a laterally opening channel extending throughout a major portion of the height of the pillar, a vertically disposed micrometer screw rotatably mounted on said pillar adjacent the upper end thereof and in substantial alignment with said channel, a vertically extending measuring bar non-rotatably but vertically slidably received in said channel, means threadably connected to said screw and connected to said bar suspending the bar from the screw and imparting vertical motion to the bar upon rotation of the screw, a scale on the pillar, said means having a part to sweep said scale and indicate roughly the vertical position of the bar, a part mounted on the screw for rotation therewith, another scale cooperating with such latter part to accurately indicate the vertical position of the bar, a reversible electrical motor mounted on said support and drivingly coupled with the screw to rotate the same, and switch means on the support connected to the motor and to a source of electric power and operable to start, stop, and determine the direction of motor rotation; said means threadably connected to said screw comprising a nut threaded on said screw; hanger arms on said nut, said pillar having vertical slots housing said hanger arms preventing rotation and permitting vertical movement of said hanger arms; said hanger arms depending from said nut secured to said measuring bar whereby vertical movement of said nut is imparted to said bar; said hanger arms being attached to said bar via vertically adjustable means for adjusting the position of said bar and the position of said parts and scales relative to one another.

References Cited in the file of this patent

UNITED STATES PATENTS

| | | |
|---|---|---|
| 2,476,674 | McCauley | July 19, 1949 |
| 2,515,583 | Bennett | July 18, 1950 |
| 2,642,669 | Ernst | June 23, 1953 |
| 2,712,696 | Johnson | July 12, 1955 |
| 2,953,855 | Rodwell | Sept. 27, 1960 |